United States Patent [19]

Ookubo et al.

[11] 4,355,848

[45] Oct. 26, 1982

[54] WHEEL COVER FOR A VEHICLE

[75] Inventors: Takao Ookubo, Yokohama; Yuko Baba, Tokyo; Kiyoshi Kamihama, Yokohama, all of Japan

[73] Assignees: Nissan Motor Co., Ltd.; Hashimoto Forming Kogyo Co., Ltd., both of Yokohama, Japan

[21] Appl. No.: 155,924

[22] Filed: Jun. 3, 1980

[30] Foreign Application Priority Data

Jun. 4, 1979 [JP] Japan .................................. 54/68842

[51] Int. Cl.³ .............................................. B60B 7/00
[52] U.S. Cl. ................................ 301/37 SS; 301/37 P
[58] Field of Search ............... 301/37 R, 37 SS, 37 P, 301/63 PW, 65; 29/159 A; 428/31

[56] References Cited

U.S. PATENT DOCUMENTS 2,713,516 7/1955 Lyon .
3,178,231 4/1965 Hezler .

FOREIGN PATENT DOCUMENTS

| 2717469 | 10/1978 | Fed. Rep. of Germany . |
| 1118590 | 6/1956 | France .............................. 301/37 SS |
| 2329458 | 5/1977 | France . |
| 54-102728 | 8/1979 | Japan ................................ 301/37 SS |
| 54-102729 | 8/1979 | Japan ................................ 301/37 SS |
| 724584 | 2/1955 | United Kingdom . |

*Primary Examiner*—H. Grant Skaggs

[57] ABSTRACT

A wheel cover (1) for a vehicle includes outer and inner peripheral portions (2 and 3) and a plurality of spoke-resembling portions (4) connecting the outer and inner peripheral portions (2 and 3) with each other. The outer and inner peripheral portions (2 and 3) and the spoke-resembling portions (4) are integrally formed by a moulding, casting or die casting process as a one-piece structure.

2 Claims, 7 Drawing Figures

WHEEL COVER FOR A VEHICLE

BACKGROUND OF THE INVENTION

The present invention relates to a wheel cover for a vehicle including radially outer and inner peripheral portions and a plurality of spoke portions located between and connected to the outer and inner peripheral portions.

A conventional wheel cover of the type mentioned above includes separate outer and inner peripheral portions and spokes which are made of metal wire, e.g., stainless steel wire, and the spokes are assembled one by one to connect the outer and inner peripheral portions with each other. Such a wheel cover necessitates a number of parts and hence a substantial number of steps and cost for its manufacture. Further, the spokes tend to loosen due to vibration and shocks during driving of the vehicle, which causes undesirable rattling of the wheel cover.

SUMMARY OF THE INVENTION

An object of the present invention is to provide an improved wheel cover which eliminates the above mentioned disadvantages.

According to the present invention, the wheel cover comprises outer and inner peripheral portions and a plurality of spoke-resembling portions or spoke members, all of which are integrally formed as a one-piece structure.

The wheel cover of such a structure can be formed by injection moulding of a suitable plastic material, or by casting or die-casting of a suitable alloy of a light metal, e.g. aluminum, magnesium or zinc. Since the work of assembling the metal wire spokes is avoided, the number of the manufacturing steps and cost are greatly reduced and the disadvantages of the conventional wheel cover are eliminated.

Preferably, each spoke-resembling portion has in the cross section a front section which is on the outer surface side, and a rear section which is on the inner surface side. The width of the front section is greater than the width of the rear section. Because of this, fins which may be formed along the parting lines between the upper and lower moulds due to an alignment error of the moulds are not visible from outside, so that the moulds can be easily manufactured.

Preferably, the spoke portion consists of two spoke-resembling members which cross each other at a point between the outer and inner peripheral portions.

The two spoke-resembling members may be staggered in the axial direction of the wheel cover at the cross point. Thus, the three dimensional appearance of the spoke portions is emphasized and the wheel cover appears to be very solid.

Preferably, the front side spoke member of each spoke portion has a front section which is thicker than its rear section, while the rear side spoke member has a front section which is thinner than its rear section. The boundary lines between the front and rear sections of the front and rear side spoke members are on a common parting plane between the upper and lower moulds, so that the moulding can be effected very easily.

Preferably, the thickness of the front portion of at least the front side spoke members decreases radially outwardly from the inner to the outer peripheral portions in order to further refine the appearance of the wheel cover.

Other features and advantages of the present invention will become apparent with reference to the following detailed description of preferred embodiments, by way of example, shown in the attached drawings.

DETAILED DESCRIPTION OF THE EMBODIMENTS

Figure 1:
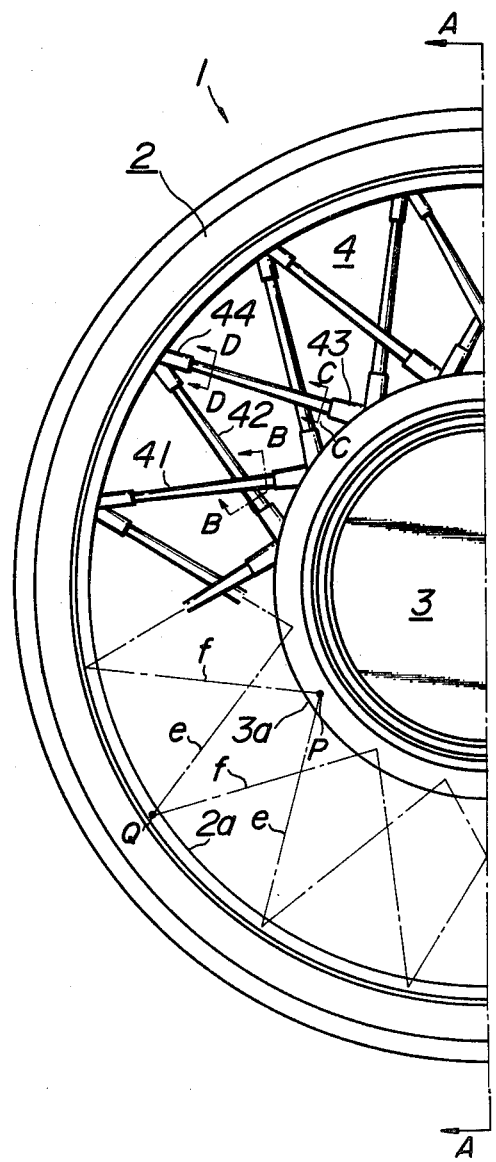
FIG. 1 is a plan view of a wheel cover according to the present invention.
Figure 2:
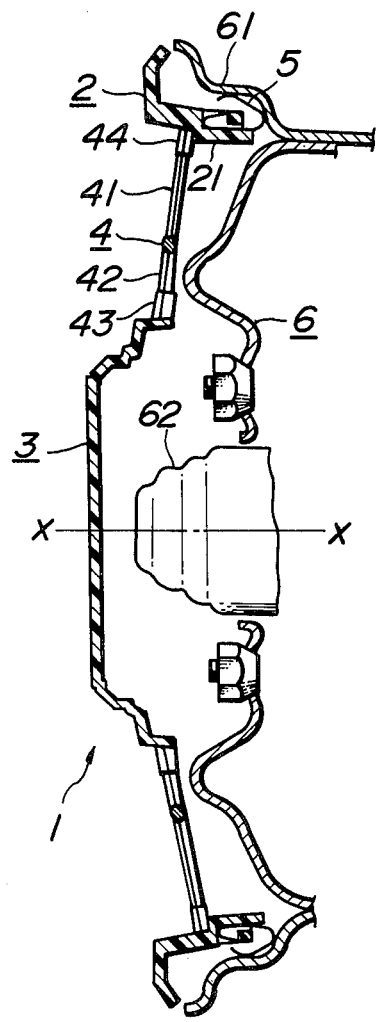
FIG. 2 is a sectional view taken along the line A—A of FIG. 1.

Referring to FIGS. 1 and 2, reference numeral 1 designates a wheel cover according to a preferred embodiment of the present invention. The wheel cover 1 comprises an annular radially outer peripheral portion 2, a disc-like radially inner peripheral portion 3 which is spaced radially inward from the outer peripheral portion 2, and a number of spoke-resembling portions 4 which connect the outer and inner peripheral portions with each other. The outer and inner peripheral portions 2 and 3 and the spoke portions 4 are integrally formed e.g. by injection moulding of a suitable plastic material.

The outer peripheral portion 2 has on the rear surface an integrally formed annular mount 21 which extends rearward coaxially with the center axis X—X of the wheel cover 1. A plurality of clips made of resilient material 5 are mounted on the outer peripheral surface of the clip mount 21 and resiliently engage with a rim 61 of a wheel disc 6. The inner peripheral portion 3 projects frontward to form a shallow dish corresponding to a hub 62 of the wheel disc 6. Instead, the inner peripheral portion 3 may be of annular shape.

Figure 3:
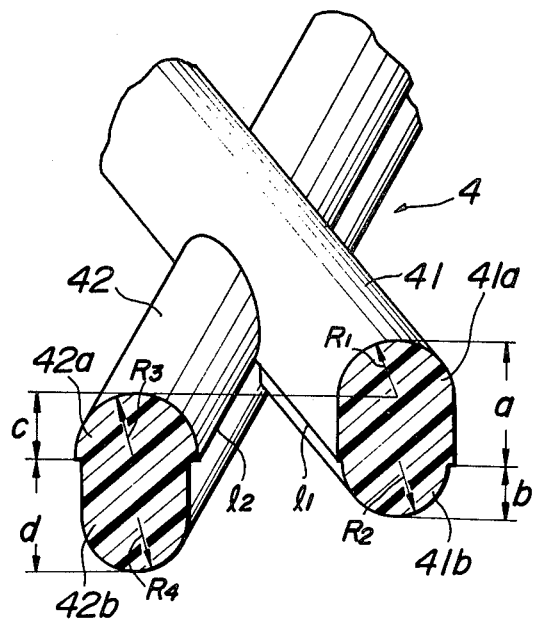
FIG. 3 is an enlarged, part-sectional perspective view taken generally along the line B—B of a portion of FIG. 1.

The spoke-resembling portions 4 according to the present invention will be described in detail. As shown in FIG. 3, each spoke-resembling portion 4 is formed by a front spoke member 41 and a rear spoke member 42 which crosses the front spoke member 41 in a staggered relation in the direction which is in parallel with the center axis X—X. The cross-sectional shape of the front and the rear spoke members 41 and 42 is formed by front sections and rear sections. The front spoke member 41 is formed by an inverted U-shaped front section 41a and a semi-circular rear section 41b. The rear spoke member 42 is formed by a semi-circular front section 42a and a U-shaped rear section 42b.

Referring to FIG. 3, $R_1$ and $R_2$ represent the radii of the front section 41a and rear section 41b of the front spoke member 41, and $R_3$ and $R_4$ the radii of the front section 42a and rear section 42b of the rear spoke member 42, respectively. The radius $R_1$ is larger than the radius $R_2$, and the radius $R_3$ is larger than the radius $R_4$.

Figure 4:
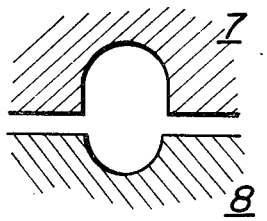
FIG. 4 is an enlarged sectional view of a portion of a cavity and core for injection moulding the wheel cover shown in FIGS. 1 and 2.

This means that each front section 41a or 42a has a width larger than that of the rear section 41b or 42b for the front or rear spoke member 41 or 42. By thus forming the front and rear spoke members 41 and 42, no fins are visible from outside which may be formed along the parting lines between a cavity 7 and a core 8 shown in FIG. 4 of a mould for injection moulding the wheel cover 1. Moreover, since an alignment error between the cavity 7 and the core 8 can be absorbed, the mould can be manufactured easily. As shown in FIG. 1, the front and rear spoke members 41 and 42 appear to be round bars or actual spokes of metal wire when seen from the front.

As shown in FIG. 3, the thickness a of the front section 41a of the front spoke member 41 is larger than the thickness b of the rear section 41b. Similarly, the thickness c of the front section 42a of the rear spoke member 42 is smaller than the thickness d of the rear section 42b. Border lines $l_1$ between the front and rear sections 41a and 41b of the front spoke member 41 and border lines $l_2$ between the front and rear sections 42a and 42b of the rear spoke member 42 intersect each other and lie on a common plane. The center of the radius $R_1$ of the front section 41a of the front spoke member 41 is on a plane which coincides with or passes slightly frontwards of the front end of the rear spoke member 42.

Thus, an improved solid or three dimensional appearance is obtained and, as both straight edge lines of the front spoke members 41 are not interrupted when seen from the front, the external appearance is further refined. Further, as the parting lines between the upper and lower moulds which form the front and rear spoke portions 41 and 42 are in a common plane, the moulds can be easily manufactured.

Figure 5A:
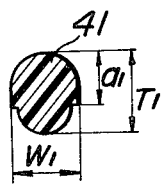
FIGS. 5A and 5B are enlarged sectional views taken along the lines C—C and D—D, respectively, of FIG. 1.
Figure 5B:
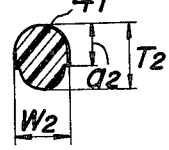

As to the dimensions of the spoke portion 4, the width and thickness of each spoke members 41 or 42 both decrease radially outward. More particularly, as shown in FIGS. 5A and 5B, the width $W_1$ at a radially inner location of the front spoke member 41 is larger than the width $W_2$ at a radially outer location. Similarly, the thickness $T_1$ at a radially inner location of the front spoke member 41 is larger than the thickness $T_2$ at a radially outer location. Further, the thickness $a_1$ at a radially inner location of the front section 41a of the front spoke member 41 is larger than the thickness $a_2$ at a radially inner location, so that the level difference at the cross point between the front and rear spoke members 41 and 42 is relatively large to improve the solid appearance.

As shown in FIGS. 1 and 2, radially inner and outer ends 43 and 44 of each spoke member 41 or 42 have larger cross sections than the adjacent parts of the spoke member, in imitation of actual spokes and to increase the mechanical strength.

As shown in FIG. 1, the radially inner cross point P of the longitudinal center line e of the front spoke member 41 and the longitudinal center line f of the rear spoke member 42 is radially inward of the outer peripheral surface 3a of the inner peripheral portion 3. Further, the radially outer cross point Q of the longitudinal center lines e and f is radially outward of the inner peripheral surface 2a of the outer peripheral portion 2. Thus, the radially inner and outer ends 43 and 44 of the spoke portion 4 can be easily formed without interference between adjacent spoke members. This serves to facilitate the manufacture and maintenance of the moulds. Also, flat portions need not be formed near the outer and inner cross points P and Q between the outer and the inner peripheral surfaces 3a and 2a, so that the appearance is not marred.

Figure 6:
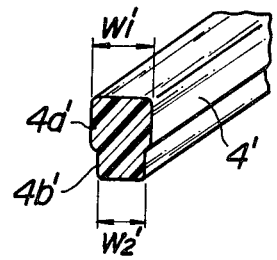
FIG. 6 is a part-sectional perspective view of a spoke portion according to another embodiment of the present invention.

FIG. 6 shows a second embodiment of the spoke portion according to the present invention. The spoke portion 4' is generally of rectangular cross-section and the width $W'_1$ of a front section 4'a of the spoke member 4' is larger than the width $W'_2$ of a rear section 4'b.

It will be appreciated that by forming the outer peripheral portion 2, inner peripheral portion 3 and the spoke portions 4 of the wheel cover integrally with each other as a one-piece structure, individual spokes are eliminated which must otherwise be assembled one by one requiring a substantial number of assembling steps and which tend to loosen due to vibration and shocks during driving. Also, as the wheel cover consists of a one-piece unit and the number of the parts is greatly decreased, stocks of the parts can be controlled very easily.

Further, by crossing the front and the rear spoke members in a staggered relation between the outer and inner peripheral portions, the appearance is refined and the strength of the spoke portion is improved.

By forming the cross-sectional dimension of the spoke member such that the width of the front section is greater than the width of the rear section, the appearance is not marred even when the parting lines between the upper and lower moulds are not accurately aligned, or fins are formed along the parting lines. Thus, the moulds can be relatively easily manufactured. Also, by decreasing the thickness of the front section of the spoke member radially outwardly, the level difference at the cross point between the front and rear spoke sections is emphasized to provide a solid appearance.

What is claimed is:

1. A wheel cover for a vehicle road wheel, comprising: an annular radially outer peripheral portion, a radially inner peripheral portion having a circular outer contour, a plurality of spoke portions located between and connected to the outer and inner peripheral portions, said outer and inner peripheral portions and said spoke portions being integrally formed into a one-piece structure, and means for attaching the one-piece structure cover to the road wheel, each spoke portion being formed by two spoke-resembling members which cross each other at a cross point between said outer and inner peripheral portions, with each member having a front section on an outer surface side and a rear section on an inner surface side, the width of the front section being greater than the width of the rear section, said two spoke-resembling members being staggered at the cross point in axial direction of the wheel cover, with the front section of the spoke-resembling member lying in front at said cross point being thicker that its rear section, and the rear section of the spoke-resembling member lying behind at said cross point being thinner than its rear section, boundary lines between said front and rear sections of the both spoke-resembling members being in a common plane.

2. A wheel cover as claimed in claim 1, wherein the thickness of said front section of at least the front side spoke-resembling members decreases radially outwardly from said inner to the outer peripheral portion.

* * * * *

UNITED STATES PATENT AND TRADEMARK OFFICE
CERTIFICATE OF CORRECTION

PATENT NO. : 4,355,848
DATED : OCTOBER 26, 1982
INVENTOR(S) : TAKAO OOKUBO, et al

It is certified that error appears in the above-identified patent and that said Letters Patent are hereby corrected as shown below:

Column 4, line 56, "that" should read -- than --;

Column 4, line 57, "rear" should read -- front --;

Signed and Sealed this

Eleventh Day of October 1983

[SEAL]

Attest:

GERALD J. MOSSINGHOFF

Attesting Officer    Commissioner of Patents and Trademarks